(12) United States Patent
Teyssier et al.

(10) Patent No.: US 10,871,214 B2
(45) Date of Patent: Dec. 22, 2020

(54) SECONDARY LOAD PATH DETECTION

(71) Applicant: Ratier-Figeac SAS, Figeac (FR)

(72) Inventors: Ghislain Teyssier, Brengues (FR); Frédéric Persouyre, Lauresses (FR)

(73) Assignee: RATIER-FIGEAC SAS, Figeac (FR)

( * ) Notice: Subject to any disclaimer, the term of this patent is extended or adjusted under 35 U.S.C. 154(b) by 254 days.

(21) Appl. No.: 15/672,459

(22) Filed: Aug. 9, 2017

(65) Prior Publication Data
US 2018/0045291 A1   Feb. 15, 2018

(30) Foreign Application Priority Data

Aug. 12, 2016 (EP) .................................. 16306054

(51) Int. Cl.
| | | |
|---|---|---|
| *F16H 57/01* | (2012.01) | |
| *F16H 25/22* | (2006.01) | |
| *F16H 25/20* | (2006.01) | |
| *B64C 13/28* | (2006.01) | |
| *F16H 25/24* | (2006.01) | |

(52) U.S. Cl.
CPC ........... *F16H 57/01* (2013.01); *B64C 13/341* (2018.01); *F16H 25/205* (2013.01); *F16H 25/2204* (2013.01); *F16H 25/2209* (2013.01); *F16H 25/2472* (2013.01)

(58) Field of Classification Search
CPC ............... F16H 57/01; F16H 2057/014; F16H 2057/018; F16H 25/205; F16H 2035/103; F16H 2035/106; F16H 2061/122; F16H 25/2006; F16H 25/2209; B64C 13/341
USPC ........................ 74/89.42, 441; 244/99.4, 99.9
See application file for complete search history.

(56) References Cited

U.S. PATENT DOCUMENTS

| | | | | | |
|---|---|---|---|---|---|
| 2,643,845 | A | * | 6/1953 | Baker | ...................... G01C 5/00 248/180.1 |
| 3,720,116 | A | * | 3/1973 | Better | ................. F16H 25/2209 74/89.42 |
| 5,263,381 | A | * | 11/1993 | Shirai | ................. F16H 25/2209 74/441 |

(Continued)

FOREIGN PATENT DOCUMENTS

| | | |
|---|---|---|
| DE | 2948210 A1 | 6/1981 |
| DE | 102011101345 A1 | 11/2012 |

(Continued)

OTHER PUBLICATIONS

European Search Report for Application No. 16306054.4 dated Mar. 9, 2017, 9 pages.

*Primary Examiner* — Bobby Rushing, Jr.
(74) *Attorney, Agent, or Firm* — Cantor Colburn LLP

(57) ABSTRACT

A nut arrangement for a screw actuator is disclosed for allowing detection of wear in a primary nut of the screw actuator. The nut arrangement comprises a primary nut for providing a primary load path and a secondary nut for providing a secondary load path. An interface ring may link the secondary nut to the primary nut. A sensor is provided to detect relative axial movement between the primary and secondary nuts. During normal operation, the interface ring is seated by a flexible coupling that allows relative axial displacement of the secondary nut to the primary nut to accommodate wear in the primary nut. The sensor can be used to monitor backlash between the primary and secondary nuts to determine wear of the primary nut.

14 Claims, 6 Drawing Sheets

(56) References Cited

U.S. PATENT DOCUMENTS

| | | | |
|---|---|---|---|
| 5,644,951 A * | 7/1997 | Hatamura | B23Q 1/34 |
| | | | 74/424.72 |
| 5,755,310 A | 5/1998 | Wourms | |
| 6,415,673 B1 * | 7/2002 | Erikson | B23Q 5/40 |
| | | | 74/424.94 |
| 6,672,540 B1 | 1/2004 | Shaheen et al. | |
| 6,672,565 B2 * | 1/2004 | Russell | E21B 21/106 |
| | | | 251/297 |
| 6,685,382 B2 * | 2/2004 | Capewell | F16H 25/2204 |
| | | | 403/343 |
| 6,913,226 B2 * | 7/2005 | Huynh | B64C 13/341 |
| | | | 244/75.1 |
| 7,299,703 B2 | 11/2007 | Balasu et al. | |
| 7,866,602 B2 | 1/2011 | Port-Robach et al. | |
| 8,033,500 B1 | 10/2011 | Charafeddine et al. | |
| 8,656,797 B2 | 2/2014 | Bassett | |
| 8,714,479 B1 * | 5/2014 | Chapman | B64C 13/341 |
| | | | 244/99.3 |
| 8,794,084 B2 * | 8/2014 | Nguyen | F16H 25/205 |
| | | | 74/89.26 |
| 8,944,372 B2 | 2/2015 | Moulon et al. | |
| 8,960,031 B2 | 2/2015 | Keech et al. | |
| 2013/0001357 A1 | 1/2013 | Cyrot | |

FOREIGN PATENT DOCUMENTS

| | | |
|---|---|---|
| EP | 1340958 A2 | 9/2003 |
| EP | 2256372 A1 | 12/2010 |
| WO | 2007024220 A1 | 3/2007 |

\* cited by examiner

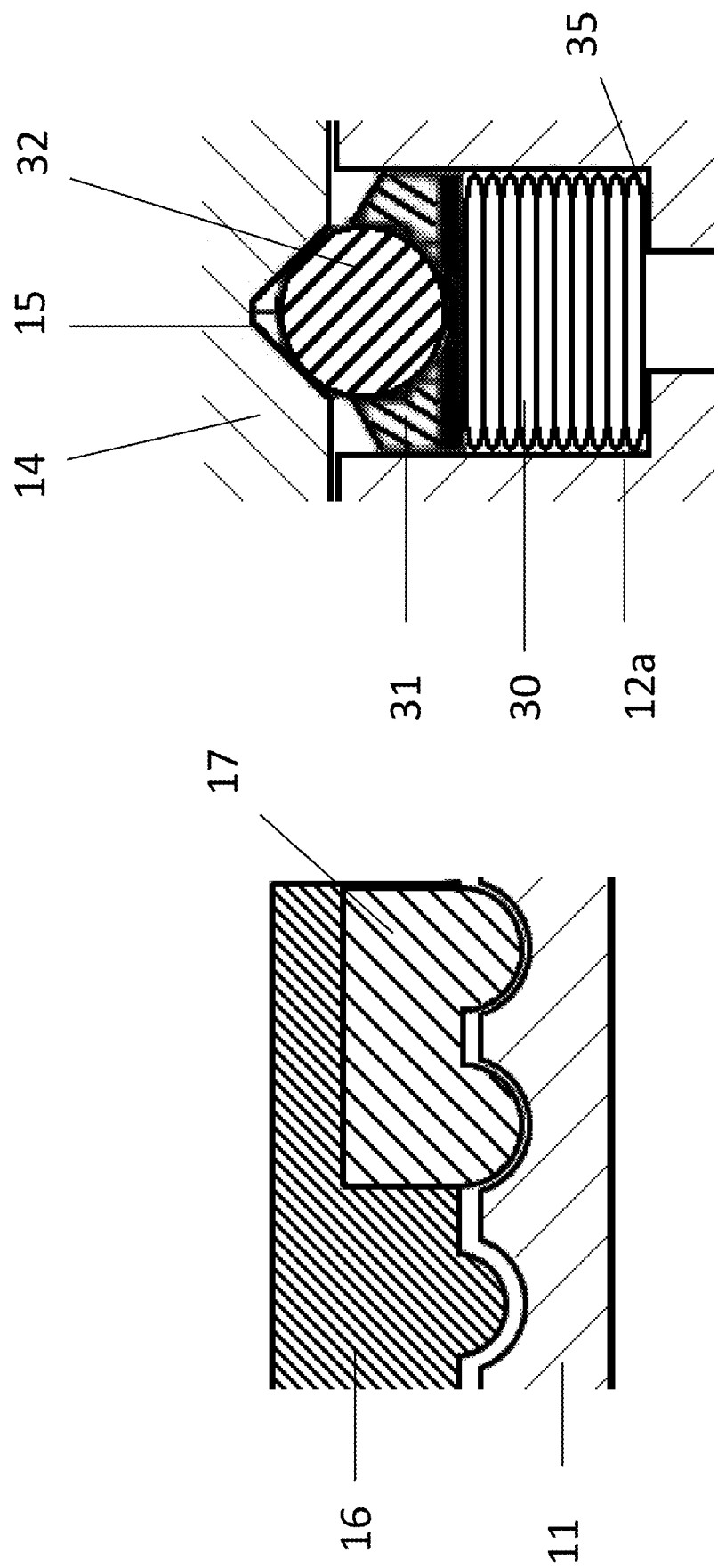

SECONDARY LOAD PATH DETECTION

FOREIGN PRIORITY

This application claims priority to European Patent Application No. 16306054.4 filed Aug. 12, 2016, the entire contents of which is incorporated herein by reference.

FIELD

The present disclosure relates to a nut arrangement for a screw actuator. It also relates to a method of detecting wear in a primary load path of an actuator.

BACKGROUND

Screw actuators are used in many vehicular applications, particularly in aircraft. They may be used to move slats and flaps of the aircraft. One application is in a horizontal trimmable stabiliser actuator (HTSA).

A typical screw actuator comprises a screw shaft having a screw thread, and one or more nuts disposed on the screw shaft. Each nut is substantially prevented from rotating (e.g. by connection to an aircraft flap) so that, when the screw shaft is rotated about its axis, the nut is forced to move along the axis of the screw shaft by the interaction of the two threads.

A ballscrew actuator is a form of screw actuator, where ball bearings are located between a thread of the nut and the thread of the screw shaft. These ball bearings help to reduce friction between the nut thread and the screw thread, and reduce wear on the threads.

Wear occurs between the nut and screw thread (or between ball bearings and screw thread) and can result in catastrophic failure where the nut will be able to slip along the axis of the screw shaft substantially independently of rotation of the screw shaft. It is therefore desirable to inspect the actuator from time to time to investigate the wear. The screw thread of the screw shaft is generally accessible and can be inspected easily. However, the thread on the nut may require the disassembly of the screw actuator.

It is known to provide a secondary nut, adjacent the first nut, as a backup nut. The secondary nut will take the load if the primary nut fails.

In such systems, a shear pin may be used, for example, as part of a claw coupling as shown in FIG. 1, to secure the primary nut to the secondary nut in normal operation when load is still being carried by a primary load path. The shear pin breaks when excessive shear is encountered, at which point a secondary load path using the secondary nut takes over.

The nut arrangement may also have a formation in the primary nut engaged with a formation on the secondary nut, e.g. a protrusion on the secondary nut which projects through a recess in the primary nut or a transfer plate connected to the primary nut, in order to transfer the load from the primary nut and the primary load path to the secondary load path if the shear pin fails. A sensor may be provided to detect shearing of the shear pin during a catastrophic failure and transfer to the secondary load path.

During use of the screw actuator, wear on the primary load path will gradually start to cause some load to be transmitted through the secondary load path before the screw actuator fails. It would be desirable to provide a nut arrangement that allows detection of the secondary load path becoming active, before complete failure of the primary load path.

SUMMARY

According to a first aspect, the disclosure provides a nut arrangement for a screw actuator, comprising: a primary nut for providing a primary load path; a secondary nut for providing a secondary load path; a coupling to link the primary nut to the secondary nut during normal operation when the primary load path is active; and a sensor to detect relative axial movement between the primary and secondary nuts, characterised in that the coupling is a flexible coupling that allows relative axial movement between the primary and secondary nuts against a bias, and in that the sensor is used as part of a wear detection arrangement to monitor a change in backlash between the primary and secondary nuts.

The sensor may be configured to monitor changes in backlash between the primary and secondary nuts on a continuous or an intermittent basis.

The sensor may include a processor configured to determine wear of the primary nut from sensor measurements or it may output the sensor measurements to another device for analysis and determination.

The flexible coupling may be arranged to decouple (shear) under conditions of excessive load.

The flexible coupling may comprise a sprung detent which engages a recess. In one example the flexible coupling may comprise a ball-spring detent. The recess may be configured to deflect a ball of the ball-spring detent against a spring bias when permitting relative axial movement between the primary and secondary nuts. The recess may be V-shaped in cross-section. The ball may have a diameter larger than the opening of the recess.

The amount of relative axial movement between the primary and secondary nuts may be defined by the size of such a recess for the sprung detent.

Such a sprung detent may be located in the primary nut, but equally might be located on the secondary nut or an interface ring extending between the primary nut and the secondary nut.

More than one flexible coupling may be provided to link the secondary nut to the primary nut.

An interface ring may be provided to link the secondary nut to the primary nut and the interface ring may be seated with respect to the primary or secondary nut by the flexible coupling. The interface ring may comprise a recess for engagement of a sprung detent, in particular a ball of a ball-sprung detent.

The interface ring may be coupled to the secondary nut with a mechanism which allows the interface ring and the secondary nut to be displaced with respect to each other to test the flexible coupling. Optionally the mechanism may comprise a mount provided on the interface ring for a bolt, a flange provided on the secondary nut and a bolt, the bolt having a tail end portion which extends through the flange of the secondary nut and into the mount. A spring may be provided towards a head end portion of the bolt to bias the head end portion of the bolt away from the flange.

The secondary nut may comprise a device configured to absorb vibration or high acceleration transmitted into the secondary nut. The device may comprise a guide ring. The guide ring may comprise a polymer such as PTFE. The sensor/wear detection arrangement may be configured with a threshold which takes into account backlash between a guide ring and a screw shaft.

The secondary nut may be provided with integral thread members to engage a thread of a screw shaft.

A claw coupling may be provided between the primary nut and the secondary nut to prevent relative rotation of the primary nut and secondary nut.

A failsafe connection comprising a transfer member may be provided between the primary and secondary nuts to transfer load to the secondary load path in the event the flexible coupling decouples. For example, a protrusion may extend from the secondary nut and project into a hole provided in the transfer member connected to or providing part of the primary nut for limiting relative axial movement between the primary nut and secondary nut. The transfer member may substantially enclose the secondary nut.

The transfer member may comprise a hole for endoscopic inspection of the primary and secondary nut.

The transfer member may comprise a pivot ring adapted to allow a lever to be placed through the transfer member and pivoted to test the flexible coupling for wear or jamming.

The present disclosure also applies to screw actuator comprising the nut arrangement as described herein. The screw actuator may be a ball-screw actuator. It may be a screw actuator for an aircraft.

According to a second aspect the present disclosure provides a method of detecting wear in a primary load path of a screw actuator, the method comprising: employing a nut arrangement for a screw actuator where a primary nut provides a primary load path and a secondary nut provides a secondary load path, and during normal operation when the primary load path is active, linking the primary nut to the secondary nut via a coupling; and detecting relative axial movement between the primary and secondary nuts using a sensor, the method being characterised by allowing relative axial movement between the primary and secondary nuts against a bias when the primary load path is active through use of a flexible coupling to link the primary and secondary nuts, and monitoring a change in backlash between the primary and secondary nuts to detect wear of the primary nut using the sensor.

The method may monitor a change in backlash between the primary and secondary nuts using the sensor on a continuous basis or an intermittent basis.

The method may comprise: linking the primary nut to the secondary nut with a flexible coupling in the form of a sprung detent which engages a recess. The flexible coupling may be in the form of a ball-spring detent.

The linking of the primary nut to the secondary nut may comprise seating an interface ring, which is connected to the secondary nut, on to the flexible coupling so that the interface ring controls relative axial positions of the primary and secondary nuts via the flexible coupling.

The method may include a testing step which comprises: inserting a lever through a pivot ring in a transfer member associated with the primary nut and secondary nut; engaging the lever with a portion of a mechanism between the interface ring and the secondary nut, and loading the lever to displace the interference ring to test the flexible coupling. The lever may test the operation of one or more sprung detents providing the flexible coupling.

The method may include a testing step comprising moving the sensor independently of the primary or secondary nut to test the sensor.

The method may comprise damping vibrations transmitted from the primary nut into the secondary nut by providing a guide ring made from a material which is more flexible than the secondary nut.

DESCRIPTION OF THE FIGURES

Certain embodiments of the present disclosure will now be described in greater detail by way of example only and with reference to the accompanying drawings in which:

FIG. 6 shows a side view of a secondary nut and with a guide ring used in the exemplary screw actuator of FIG. 2; and FIG. 7 shows an enlarged view of an exemplary ball-spring detent for the flexible coupling.

DETAILED DESCRIPTION

The present disclosure will be described with reference to an exemplary screw actuator in the form of a ballscrew actuator. As described below, the present disclosure relates to a method and apparatus for detecting the wear of the primary nut thread. However, in addition to the ability to detect wear, the apparatus and method may also detect failures of other parts of the primary load path (transfer plates, primary nut trunnions, balls migrations, etc.).

Known ballscrew actuators for aircraft utilise a primary nut and a secondary nut which are linked by a breakable shear pin. The primary nut has an internal thread that engages with the thread of the screw shaft via ball bearings. The secondary nut is held at a fixed distance from the primary nut by the shear pin. The shear pin provides a rigid coupling. The width of the thread of the secondary nut is set so that initially all the load, e.g. from a flap of an aircraft, is transmitted via a primary load path of the primary nut. However, the primary nut is subject to wear, and through that will gradually start to transfer load via the secondary nut into the secondary load path.

If the thread of the primary nut fails and no longer engages the screw shaft properly, then the secondary nut engages the screw shaft, either by turning of the screw shaft within the secondary nut and/or by loading of the secondary nut by the adjustable flap. In this situation, the load path is a path along the screw shaft, via the screw shaft thread into the secondary nut, and momentarily via the shear pin into the primary nut, and from the primary nut into the adjustable flap. As such, the load path now travels, at least momentarily, through the shear pin. When the shear pin inevitably breaks, as it is designed to do, the distance between the first nut and the second nut can change. A transfer plate or housing connected to the adjustable flap and flanges attached to the primary nut may surround a protrusion on the secondary nut in order to limit this relative movement and transmit load through the transfer plate along the secondary load path. The transfer plate or other mechanical coupling arrangement may be provided, so that the screw actuator may still be operated when the secondary load path is in operation.

In the known actuators, the relative axial distance between the primary nut and secondary nut is measured by a sensor, such as an LVDT sensor. A change of distance measured by the sensor indicates that the primary nut has failed and must be replaced.

Thus, the prior art systems provide a backup in the form of the secondary nut, as well as a sensor to show when the primary nut has failed. However, such systems with a shear pin are not able to measure wear on the primary nut before the primary nut fails. Instead, the screw actuator must be dismantled during routine maintenance to inspect the internal screw threads of the nuts.

Figure 1:
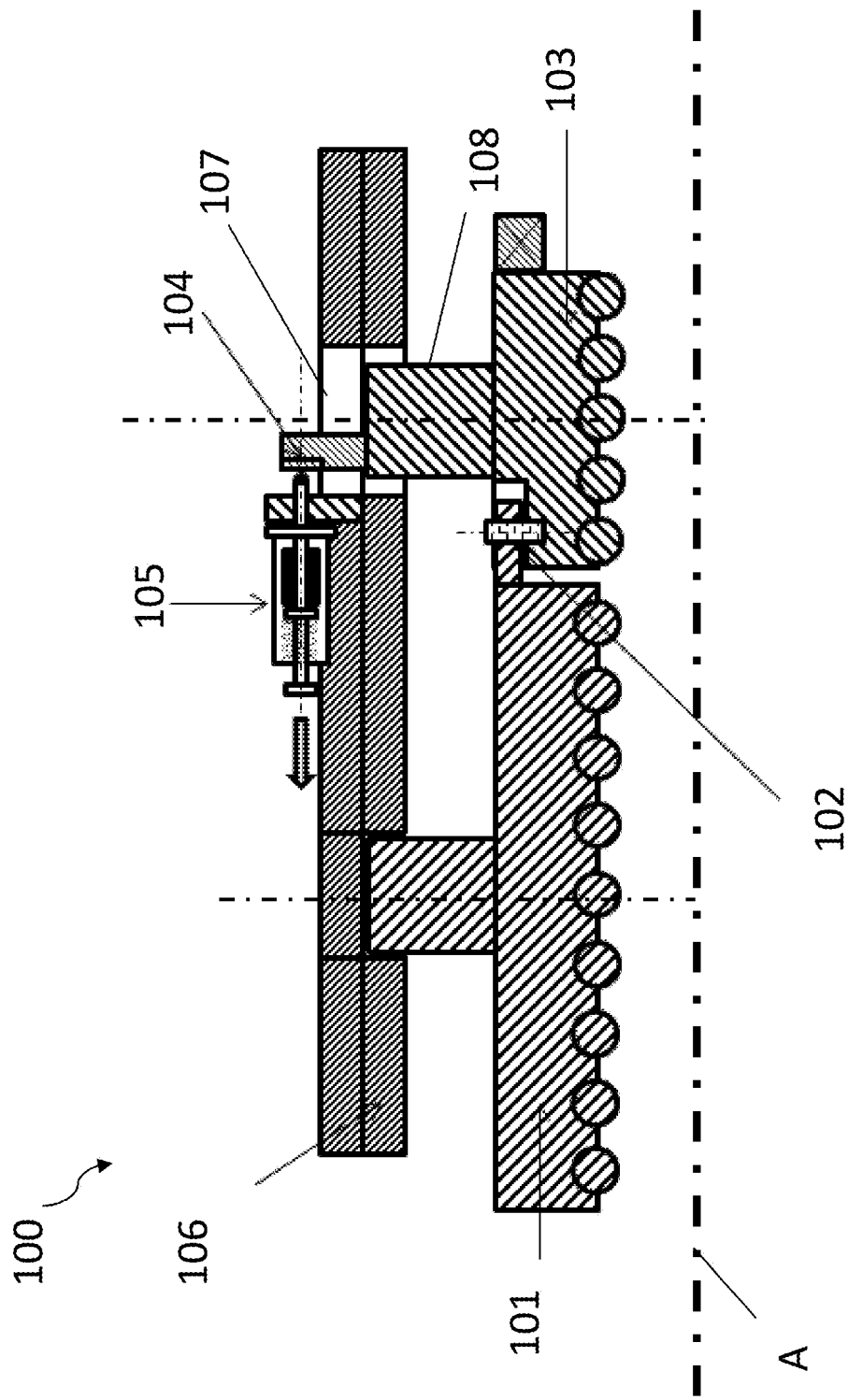
FIG. 1 shows a side-on sectional view of one half of a prior art nut arrangement for a screw actuator.

FIG. 1 shows an exemplary prior art nut arrangement 100 for a screw actuator. This arrangement 100 comprises a primary nut 101 which is a ball-screw nut. The primary nut 100 is connected to a secondary nut 103 by a breakable shear pin 102. The secondary nut 103 is also a ballscrew nut in this example, however screw threads for secondary nuts are also known in the prior art. The primary nut 101 and secondary nut 103 are mounted on a screw shaft (not shown in the figure) and both nuts 101, 103 extend around a centerline axis A of the screw shaft. The secondary nut 103 is held in a position by the primary nut 101 and shear pin 102 at which the thread of secondary nut does not engage the screw shaft, at least initially. The secondary nut is therefore not generally subjected to wear or loading so long as the primary nut is not particularly worn and is functioning properly. Once wear starts to occur on the primary nut 101, the rigid coupling provided by the shear pin 102 of the prior art nut arrangement begins to load the secondary nut 103 which results in wear of the secondary nut 103.

Routine disassembly is required to inspect the primary nut 101 and check it for wear. If undetected, the wear on the primary nut 101 may lead to catastrophic failure of the screw actuator through shearing of the shear pin 102.

A transfer plate 106 is rigidly mounted to the primary nut 101. The transfer plate 106 may resemble a housing and is provided to transfer load via the secondary load path in the event of a catastrophic failure. A position sensor 105, such as an LVDT sensor, is mounted to the transfer plate 106. The sensor 105 detects a distance to a target 104 that is rigidly mounted to a protrusion 108 of the secondary nut 103. The target 104 extends through a hole 107 in the transfer plate 106. The hole 107 is sized so as to allow some relative movement between the primary nut 101 and the secondary nut 103 before the protrusion 108 on the secondary nut 103 abuts one side or the other of the hole 107. If the primary nut 101 fails, then the shear pin 102 shears and the load path switches from the primary load path to the secondary load path. Load then travels through the secondary nut 103 and into the transfer plate 106.

When the shear pin 102 has sheared, the secondary nut 103 can move, at least to a small degree, relative to the primary nut 101, the transfer plate 106, and the sensor 105 within the constraints of the protrusion 108 in the hole 107. The sensor 105 may detect this movement and may output an alert to a user that the relative axial distance between the nuts 101, 103 has changed and the primary nut 101 has failed. The secondary nut 103 may then be driven by the screw shaft and, when the protrusion 108 of the secondary nut 103 abuts a side of the hole 107 of the transfer plate 106, the transfer plate 106 will be moved along the screw shaft by the secondary nut 103. In this way, a failsafe mechanism is provided and the screw actuator 100 may still be operated to actuate, for example, an aircraft flap. The user (a pilot or maintenance engineer) can be notified that the primary nut 101 has failed and the actuator 100 is in need of repair.

Figure 2:
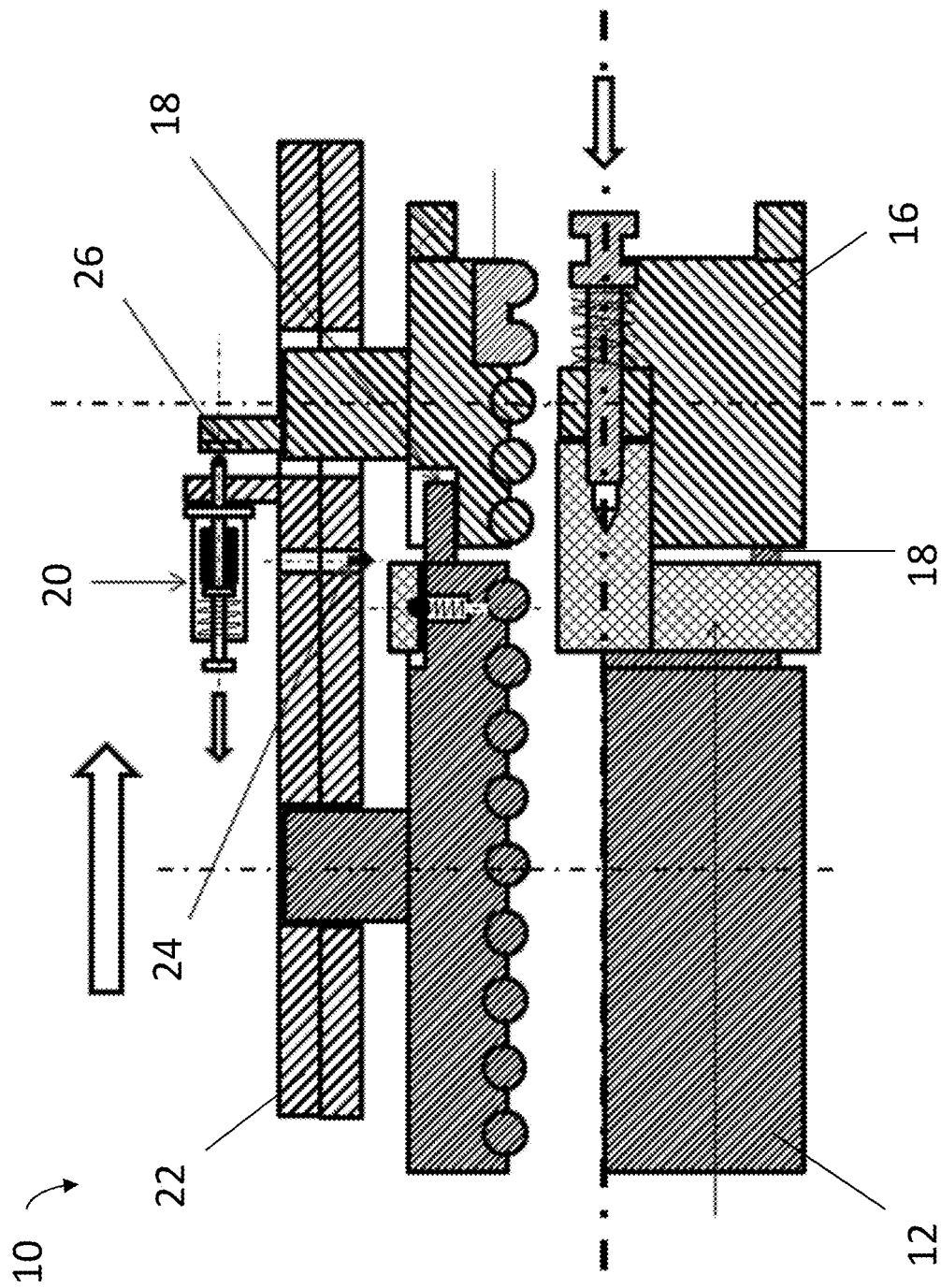
FIG. 2 shows a combination view with a cross-sectional view (upper portion) and side view (lower portion) of an exemplary actuator in accordance with the present disclosure.

FIG. 2 shows a combination view of an exemplary nut arrangement 10 in accordance with the present disclosure, with a partial cross-section (upper portion of the figure) showing internal detail and a partial side view (lower portion of the figure) showing external detail of the exemplary nut arrangement. The dashed lines joining the images denote equivalent planes in the two partial views.

The present disclosure will hereafter refer to an adjustable flap as the device being actuated by the screw actuator 10; however the screw actuator of the present disclosure is envisaged as being applicable to other devices.

Figure 3:
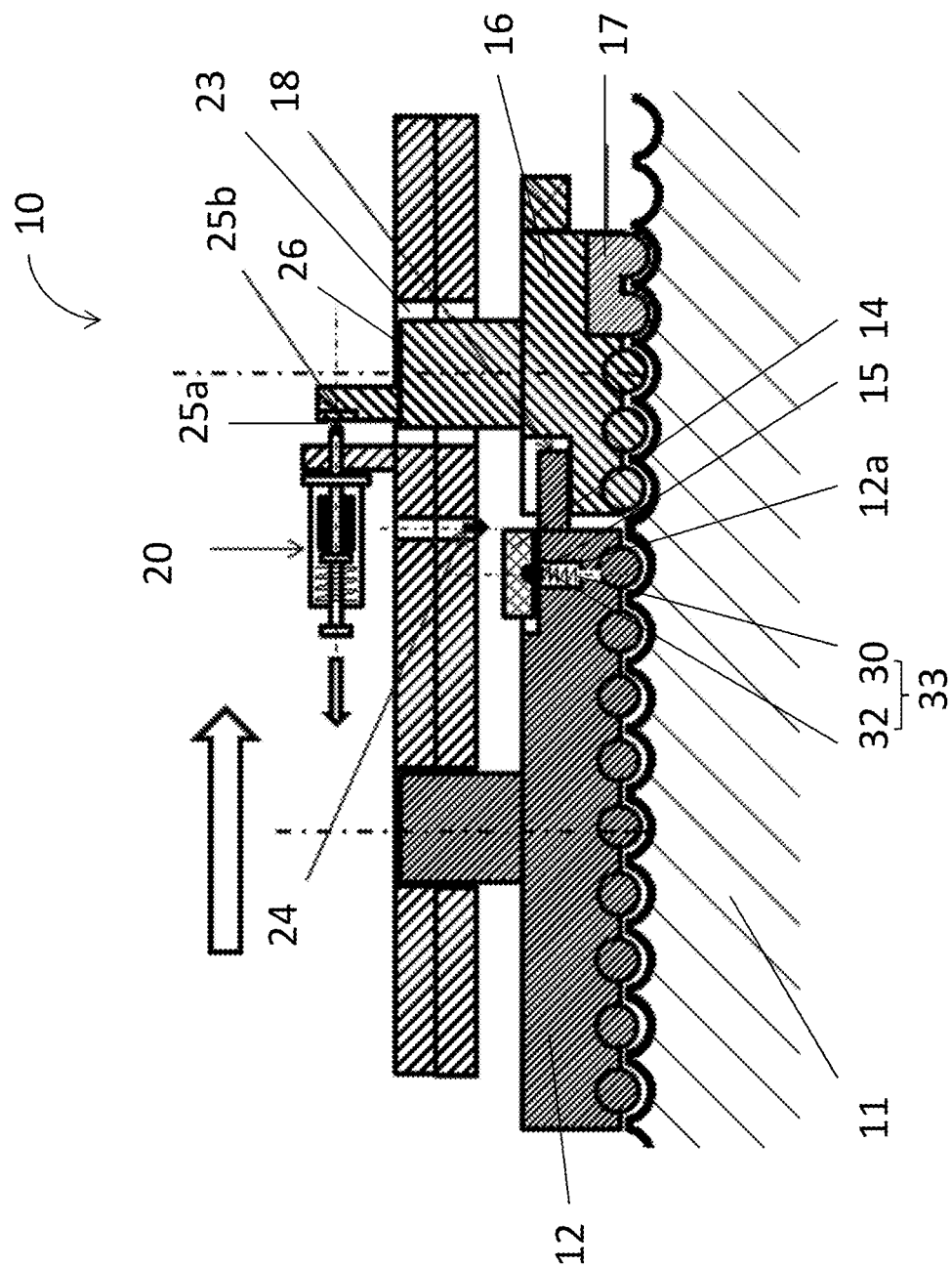
FIG. 3 shows a more detailed view of the upper portion of FIG. 2 (the cross-section portion)

A primary nut 12 and a secondary nut 16 are disposed on the screw shaft 11 (see FIG. 3). An interface ring 14 may be disposed adjacent to a portion of the primary nut 12 and to a portion of the secondary nut 16. The interface ring 14 may link the primary nut 12 to the secondary nut 16 to maintain their relative axial positions. The interface ring 14 may be seen, in effect, as an extension of the secondary nut 16.

During normal operation, when the primary load path is active, the interface ring 14 controls the relative axial positions of the nuts 12, 16 via a flexible coupling, which allows a limited amount of axial movement between the primary and secondary nuts until the shear load becomes too great and the coupling decouples (the opposed parts of the flexible coupling, in effect, "shear"). The nut arrangement 10 may be provided with more than one flexible coupling.

The primary nut 12 and secondary nut 16 may also be connected by a claw coupling 18 that prevents relative rotation between the two nuts 12, 16.

Further, the primary nut 12 and secondary nut 16 may be substantially enclosed by a transfer member 22 to provide a failsafe connection for transferring load from the primary nut 12 to the secondary nut 16 in the event that the flexible coupling linking the primary and secondary nuts 12, 16 decouples. The transfer member 22 may be in the form of a housing and rigidly attached to the primary nut 12. The transfer member 22 may connect to an aircraft flap and may also generally protect the nuts 12, 16 from debris.

The interface ring 14 may be seated on the primary nut 12 via a sprung detent, for example, in the form of a ball-spring detent 33 (see FIG. 7). The ball-spring detent 33 may be comprised of a spring 30 disposed in a cylindrical hollow 12a in the primary nut 12. The spring 30 may be a helical spring. On top of the spring 30 a ball bearing 32 may be retained in a collar 31. The biasing force provided by the spring 30 can be adjusted, for example, using one or more shims 35 to adjust spring pre-load.

When the interface ring 14 is correctly located on the primary nut 12 in an initial, neutral-bias position, the ball bearing 32 may be pushed radially outward from the primary nut 12 into the V of a V-shaped recess 15 disposed in the inner circumference of the interface ring 14. The V-shaped recess 15 may be a channel extending around an inner circumference of the interface ring 14, or it may be a conical recess or short V-shaped channel disposed at an inner surface of the interface ring 14 locally to the ball-spring detent 33. There may be one, or two, or three, or more ball-spring detent 33 devices disposed around the primary nut 12 to connect the interface ring 14. These ball-spring detent 33 devices may all interface with a single V-shaped channel 15, or may each interface with a given conical recess or short V-shaped channel 15 in the interface ring 14.

The ball-spring detent 33 may seat the interference ring 14 at a neutral-bias position with respect to the primary nut 12. It may also allow some relative axial movement of the interface ring 14 relative to the primary nut 12, either side of the neutral-bias position during normal operation when the primary load path is active.

Thus, there is provided a flexible coupling (the sprung detent 33 co-operating with the recess 15) between the primary nut 12 and the interface ring 14, which biases the interface ring 14 to return to a neutral-bias position (i.e. where the ball bearing 32 sits in the V of the V-shaped circumferential channel or recess 15). The flexible coupling allows a small range of axial displacement against a progressively increasing bias from the spring 30 before the detent 33 escapes the recess 15 and the flexible coupling decouples or "shears".

Initially the relative positions of the primary and secondary nuts 12, 16 will be set so that the load is taken through the primary nut 12. As the primary nut 12 begins to wear, the secondary nut 16 will be drawn into contact with the thread of the screw shaft 11. However, in contrast to the prior art shear pin 102, the flexible coupling allows the secondary nut 16 to move slightly with respect to the primary nut 12. In this way, the flexible coupling can take up the movement resulting from a limited amount of wear on the primary nut 12, so that load, which might otherwise be transmitted through the secondary nut 16 and into the secondary load path, is taken through the primary load path. The flexible coupling between the primary and secondary nuts 12, 16 effectively acts as a spring to compensate for differences in the relative axial positions of the nuts 12, 16. Wear on the secondary nut 16 is thereby avoided or at least minimised, while the primary load path is active.

Change in backlash (play) between the primary and secondary nuts 12, 16 can then be monitored by a sensor 20, for example an LVDT sensor, in particular one provided for monitoring for failure of the primary load path, to gain an indication of the wear on the primary nut 12. The sensor 20 may be used as part of a wear detection arrangement to monitor a change in backlash between the primary and secondary nuts.

The sensor 20 can be used to monitor a change in backlash during use of the screw actuator 10, since the change in backlash gives rise to a change in relative axial spacing of the primary and secondary nuts 12, 16. The sensor 20 may be used to monitor the change on a continuous or semi-continuous basis. The sensor 20 may record data during use and that data may be analysed, e.g., by a control system, to determine progression of backlash, and hence monitor wear of the primary nut.

Given sufficient force, the ball bearing 32 can be forced back into the blind hole 12a against the force of the spring 30 by the sloping surface of the V-shaped recess 15 and the flexible coupling can decouple (parts supporting the sprung detent 33 and the recess 15 become detached in a shearing movement) as the ball 32 disengages the V-shaped recess 15, such that the interface ring 14 can be moved relative to the primary nut 12 over a set distance (e.g., analogous to the shear pin 102 shearing in the known actuators).

Thus, the ball-spring detent 33 can be seen to provide a flexible coupling between the nuts 12, 16 that allows a small range of axial displacement against a bias during normal operation, before the flexible coupling decouples and the secondary load path takes over from the primary load path.

Figure 4:
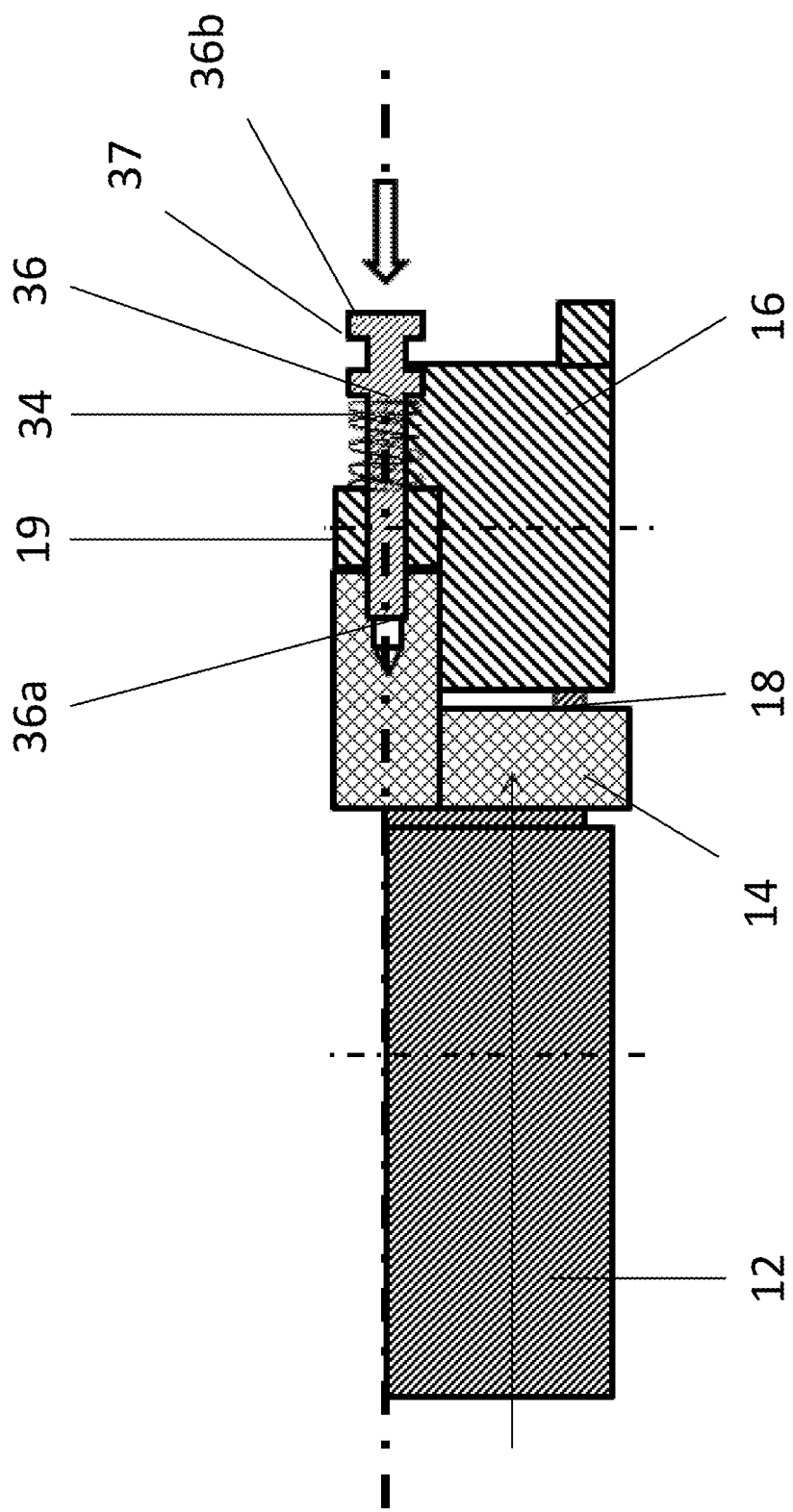
FIG. 4 shows a more detailed view of the lower portion of FIG. 2 (the side view portion)

The interface ring 14 may provide an extension of the secondary nut 16 and may be connected to the secondary nut 16 with a mechanism that allows the parts, the interface ring 14 and the secondary nut 16, to be displaced with respect to one another. As shown in FIG. 4, the mechanism may take the form of a bolt 36 that is attached to the interface ring 14 at a tail end portion 36a of the bolt 36, with the bolt extending through a flange 19 of the secondary nut 16 towards a head end portion 36b.

In this example, the bolt 36 may have a flange 37 at its head end portion 36b, opposite the tail end portion 36a. A spring 34 may be disposed around the bolt 36 and between the flange 37 of the bolt 36 and the flange 19 of the secondary nut 16. The spring 34 may be in compression between the two flanges 37, 19, and thus act to bias the secondary nut 16 into abutment with the interface ring 14. The bolt 36 may include a shoulder (not shown) inside the spring and located near the flange 19 to limit movement of the bolt 36 through the flange 19.

Figure 5:
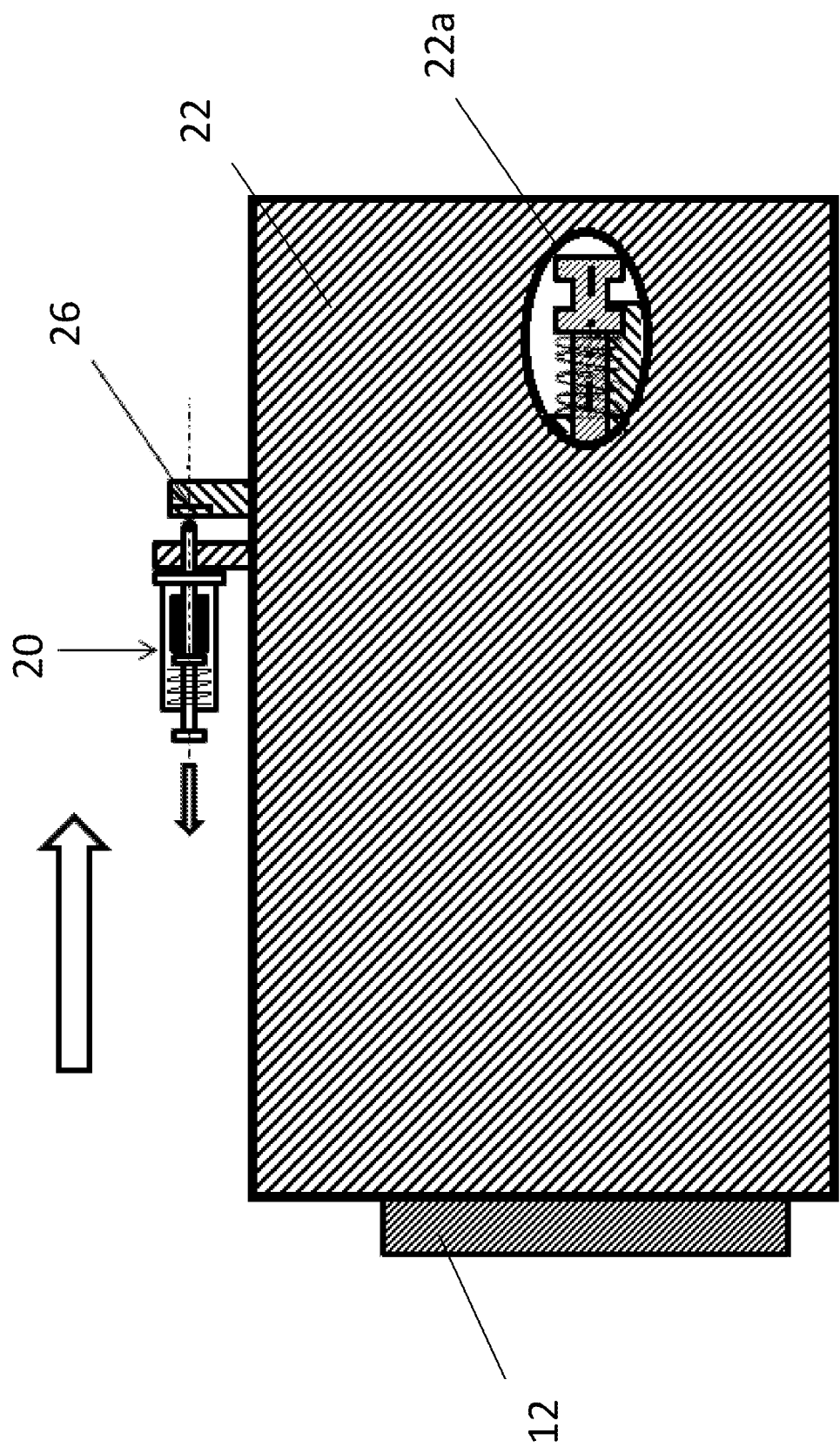
FIG. 5 shows a side view of the nut arrangement with a hole for a lever to test the flexible coupling.

The bolt 36 may allow the user to test the flexible coupling between the interface ring 14 and the primary nut 12. It is possible for the connection of the ball-spring detent 33 and V-shaped channel 15 to jam or wear undesirably. To test the flexible coupling, the user places a lever into a pivot ring 22a (see FIG. 5) of the transfer member 22. The pivot ring 22a provides a pivot point for the lever. One end of the lever engages the flange 37 of the bolt 36 and the user pulls on the other end of the lever. By pulling on the lever, the user pushes on the bolt 36 and, by feel, can tell if the connection of the interface ring 14 and the primary nut 12 is moving freely.

There may be two such bolts 36, provided on opposite sides of the nut arrangement.

During normal operation the secondary ring 16 may be in abutment with the interface ring 14 to hold the secondary ring 16 at an axial position relative to the primary nut 12 such that the thread of the secondary nut 16 generally does not engage the thread of the screw shaft 11. Further, the secondary nut 16 may not directly abut the primary nut 12; that is, the interface ring 14 holds the secondary nut 16 at a position where the secondary nut 16 may not touch the primary nut 12.

The secondary ring 16 may be made of steel, but other materials such as light weight metals are envisaged.

The secondary nut 16 may include a guide ring 17 situated at one end of the secondary nut 16 and seated inside the secondary nut 16 facing the screw thread. The guide ring 17 may be made of a material that is more flexible than the material of the secondary nut 14, for example, PTFE or other suitable polymer.

As shown in FIG. 6, the guide ring 17 may be threaded and may have a wider thread than the thread of the secondary nut 16. The thread of the guide ring 17 may be wider than the thread of the secondary nut 16, and may be wide enough to engage the thread 11 of the screw shaft at all times. If the primary nut 12 experiences high acceleration or vibration (from either the screw shaft or from the adjustable flap), the vibration may be transmitted to the secondary nut 16. The guide ring 17 is provided to absorb this vibration and thereby protect the thread of the secondary nut 16 from being worn by banging against the screw shaft thread 11 when high acceleration/vibration occurs. The guide ring 17 also serves to brake the motion of the secondary nut 16 if there is a catastrophic failure in the primary nut 12. Thus the guide ring 17 may act as a secondary means of retention in case of high acceleration or vibration.

The secondary nut 16 may be provided with a protrusion 26 that extends through a hole 23 in the transfer member 22. The hole 23 may be larger than the protrusion 26 so as to allow limited axial movement of the secondary nut 16 relative to the transfer member 22, beyond the movement allowed by the flexible coupling (the detent 33 in the recess 15). The sensor 20 may be mounted rigidly to the transfer member 22. The sensor 20 may be a distance sensor, such as a LVDT sensor. It may be an electronic sensor and output an electrical signal to a computer or recorder which is configured to determine the wear from the signal. The sensor may measure the distance between the probe 25a and a target 25b mounted on the protrusion 26 of the secondary nut 16 that extends through the transfer member 22.

Thus, if the secondary nut protrusion 26 moves within the hole 23, the sensor 20 may detect this movement and output a signal. During normal operation, the movement detected may correspond to the limited relative axial movement allowed by the flexible coupling and any wear in the nuts 12, 16. The signal may provide an indication of the backlash between the primary and secondary nuts 12, 16. The backlash may be monitored over time via the signal and a change in backlash may be determined to gauge the amount of wear on the primary nut 12. An alert might be issued when a threshold change in backlash is observed.

To improve accuracy, the sensor 20 or other part of a wear detection arrangement may be configured so that relative movement resulting from the more flexible material of a guide ring 17 is taken account of. The guide ring 17 and secondary nut 16 may include integral thread portions (teeth) that engage the screw shaft 11 to reduce the amount of play that might otherwise be associated with ball bearings used to couple the thread of the secondary nut to the thread of the screw shaft. This may simplify construction by reducing the number of parts.

Should the sensor 20 detect that the primary nut 12 has failed, a further warning might be triggered to indicate to the user that the screw actuator is operating via its secondary load path.

There may be one sensor 20, or there may be two (or more) sensors 20, e.g., two LVDT sensors, to provide redundancy in detecting the distance between the nuts 12, 16. The sensor 20 may be positioned on the exterior of the nut arrangement to allow easy access for servicing and replacement.

The above described system may be used to detect wear on the thread of the primary nut 12 without requiring disassembly.

In more detail, during normal operation, the secondary nut 16 is driven along the axis of the screw shaft 11 by being pushed/pulled by the primary nut 12 via the interface ring 14, as described above. That is, in this situation, at least initially the secondary nut 16 is not being driven by loading forces between the thread of the secondary nut 16 and the thread of the screw shaft 11.

When the thread on the primary nut 12 becomes worn, then when the primary nut 12 is actuated along the screw shaft 11 in a direction away from the secondary nut 16, the primary nut 12 will sit further from the secondary nut 16. That is, the distance between the primary nut 12 and the secondary nut 16 will increase, as allowed by the flexible coupling and the interface ring 14. This causes the thread of the secondary nut 16 to engage with the thread of the screw shaft 11 and the secondary nut 16 will experience loading via its thread. This will further load the flexible coupling between the nuts 12, 16, which will stretch to accommodate. For example, the ball bearing 32 may ride out from a narrow region of the V-shaped recess 15 up the sides of the V-shaped recess towards one edge of the recess 15. However, as the thread on the secondary nut 16 has not generally been loaded during previous actuation of the screw actuator 10, the secondary nut 16 thread is not worn at this time.

In this way, wear of the primary nut 12 thread can be determined by measuring the change in backlash between the primary and secondary nuts 12, 16. The secondary nut 16 may comprise an integral thread (e.g., as shown in FIG. 6) rather than using balls to engage the thread of the screw shaft 11 to reduce the amount of backlash attributable to the secondary nut 16. The flexible coupling, by reducing the amount of wear on the secondary nut 16 further reduces the need for ball-bearings on this nut 16.

Excessive wear of the primary nut 12 may then be detected using the sensor 20 long before there is any risk of slippage between the primary nut 12 and the screw shaft 11. Further, wear of the primary nut 12 may be detected without having to remove the primary nut 12 from the screw actuator. However, the secondary nut 16 also functions as a redundant nut in case of failure of the primary nut 12 and may be less worn than the prior art arrangements through the relative axial movement allowed at flexible coupling. If the primary nut 12 fails completely, the secondary nut 16 engages the screw shaft 11 and provides a load path with respect to the shaft. If the connection between the ball-spring detent 33 and interface ring 14 fails such that interface ring 14 detaches from the primary nut 12, then the transfer member 22 (rigidly attached to the primary nut 12) moves relative to the secondary nut 16. However, the transfer member 16 is not totally free to move due to the protrusion 26 of the secondary nut 16 moving within the hole 23. Actuation of the screw actuator 10 will move the secondary nut 16 and, when the protrusion 26 of the secondary nut 16 abuts a side of the hole 23, the transfer member 22 will be pulled/pushed by the secondary nut 16.

The transfer member 22 may also include a second hole 24 located near the interface ring 14 to allow inspection of the interface ring 14 and its connection to the primary nut 12 and secondary nut 16. The second hole 24 may be sized to receive an endoscope.

The bolt 36 of the interface ring 14 may include a second flange (not shown) adjacent the first flange 37. During testing with a lever, as described above, the lever may engage the second flange in order to pull the head end portion 36a of the bolt 36 away from the primary nut 12. Having a second flange in addition to the first flange 37 on the bolt 36 allows testing of the ball-spring detent's connection to the interface ring 14 in both loading directions. The sensor 20 may detect a change of distance between the primary nut 12 and the secondary nut 16 caused by the lever-action and output a corresponding signal. This signal may alert the user that the distance between nuts 12, 16 has changed and that the amount of backlash is excessive.

From knowing the secondary nut 16 has not been previously loaded (and worn), it may be concluded that a change of distance between the primary and secondary nuts 12, 16 can only have been caused by wear of the primary nut thread.

The presently disclosed method and apparatus provide additional functionality to a screw actuator having primary and secondary load paths. That is, the apparatus and method disclosed herein may detect wear in the primary nut as well as other deterioration in the nut arrangement which can lead to load being transferred to the secondary load path or otherwise affecting the operation of the screw actuator.

The following clauses provide alternative aspects and optional features of the present disclosure which may be used as basis for amendments or divisional applications:

1. A nut arrangement for a screw actuator, comprising:
   a primary nut for providing a primary load path;
   a secondary nut for providing a secondary load path; and
   a sensor to detect relative axial movement between the primary and secondary nuts,
   wherein an interface ring is provided to link the secondary nut to the primary nut; and the interface ring is seated in an operative position by a coupling that can be displaced against a bias to allow relative axial movement between the primary and secondary nuts as the primary nut wears.

2. The nut arrangement according to clause 1, wherein the coupling comprises a sprung detent which engages a recess.

3. The nut arrangement according to clause 2, wherein the sprung detent is provided in the primary nut.

4. The nut arrangement according to clause 2 or 3, wherein the recess is provided in the interface ring.

5. The nut arrangement according to clause 2, 3 or 4, wherein the sprung detent is a ball-spring detent.

6. The nut arrangement according to clause 5, wherein the recess is configured to deflect a ball of the ball-spring detent against a spring bias when permitting relative axial movement interface ring.

7. The nut arrangement according to any preceding clause, wherein the interface ring is connected to the secondary nut by a mechanism which allows displacement in order to test the coupling of the interface ring to the other nut.

8. The nut arrangement according to any preceding claim, wherein the secondary nut comprises a guide ring of a more flexible material configured to absorb vibration or high acceleration transmitted into the secondary nut 9. The nut arrangement of clause 8, wherein the guide ring is comprised of a polymer.

10. The nut arrangement of clause 9, wherein the guide ring is comprised of PTFE.

11. A method of detecting wear in a primary load path of a screw actuator, the method comprising:

providing a nut arrangement for a screw actuator where a primary nut provides a primary load path and a secondary nut provides a secondary load path;

an interface ring linking the primary nut to the secondary nut and a sensor detecting relative axial movement between the primary and secondary nuts;

the interface ring being seated in an operative position by a coupling that can be displaced against a bias to allow relative axial movement between the primary and secondary nuts as the primary nut wears; and sensing with the sensor relative axial distance between the primary and secondary nuts to detect wear.

12. The method of detecting wear according to clause 11, comprising providing a coupling in the form of a sprung detent; and seating an interface ring via the sprung detent.

13. The method of detecting wear according to clause 12, comprising providing a coupling in the form of a ball-spring detent.

14. The method of clause 12 or 13, comprising:

mounting the sprung detent in the primary nut;

seating the interface ring on the primary nut via the sprung detent; and connecting the interface ring to the secondary nut with a mechanism that allows testing of the sprung detent.

15. The method of any of clauses 11 to 14, comprising:

damping vibrations transmitted from the primary nut into the secondary nut by providing a guide ring made from a material which is more flexible than the secondary nut.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A nut arrangement for a screw actuator, comprising:

a primary nut for providing a primary load path;

a secondary nut for providing a secondary load path;

a flexible coupling to link the primary nut to the secondary nut during normal operation when the primary load path is active, wherein the flexible coupling provides a bias that allows relative axial movement between the primary and secondary nuts; and a sensor to detect relative axial movement between the primary and secondary nuts, wherein the sensor is used as part of a wear detection arrangement to monitor a change in backlash between the primary and secondary nuts;

wherein an interface ring is provided to link the secondary nut to the primary nut and the interface ring is seated with respect to the primary or secondary nut by the flexible coupling;

wherein the interface ring is coupled to the secondary nut with a mechanism which allows the interface ring and the secondary nut to be displaced with respect to each other to test the flexible coupling; and wherein the mechanism comprises a mount provided on the interface ring for a bolt, a flange provided on the secondary nut and a bolt, the bolt having a tail end portion which extends through the flange of the secondary nut and into the mount, and wherein a spring is provided towards a head end portion of the bolt to bias the head end portion of the bolt away from the flange.

2. The nut arrangement according to claim 1, wherein the flexible coupling comprises a sprung detent which engages a recess.

3. The nut arrangement according to claim 2, wherein the sprung detent is located in the primary nut.

4. The nut arrangement of claim 2 wherein the sprung detent is a ball-spring detent.

5. The nut arrangement of claim 4, wherein the recess is configured to deflect a ball of the ball-spring detent against a spring bias when permitting relative axial movement between the primary and secondary nuts.

6. The nut arrangement according to claim 1, wherein the secondary nut comprises a device configured to absorb vibration or high acceleration transmitted into the secondary nut.

7. The nut arrangement of claim 6, wherein the device comprises a guide ring.

8. The nut arrangement of claim 7, wherein the guide ring is comprised of PTFE.

9. The nut arrangement according to claim 1, wherein a claw coupling is provided between the primary nut and the secondary nut to prevent relative rotation of the primary nut and secondary nut.

10. The nut arrangement according to claim 1, wherein a failsafe connection comprising a transfer member is provided between the primary and secondary nuts to transfer load to the secondary load path in the event the flexible coupling decouples.

11. The nut arrangement according to claim 10 wherein the transfer member comprises a hole for endoscopic inspection of the primary and secondary nut.

12. The nut arrangement according to claim 10, wherein the transfer member comprises a pivot ring adapted to allow a lever to be placed through the transfer member and pivoted to test the flexible coupling for wear or jamming.

13. The nut arrangement of claim 10, wherein a protrusion extends from the secondary nut and projects into a hole provided in the transfer member connected to or providing part of the primary nut for limiting relative axial movement between the primary nut and secondary nut.

14. The nut arrangement of claim 13, wherein the transfer member substantially encloses the secondary nut.

* * * * *